US006832240B1

(12) United States Patent
Dutta (10) Patent No.: US 6,832,240 B1
(45) Date of Patent: Dec. 14, 2004

(54) METHOD, SYSTEM, AND PROGRAM FOR CONNECTING TO AN ELECTRONIC COMMERCE WEB SITE

(75) Inventor: Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 953 days.

(21) Appl. No.: 09/696,775

(22) Filed: Oct. 26, 2000

(51) Int. Cl.⁷ .............................................. G06F 15/16
(52) U.S. Cl. ...................................... 709/203; 705/26
(58) Field of Search ................................ 709/203, 212, 709/217, 223, 238; 705/26, 21

(56) References Cited

U.S. PATENT DOCUMENTS

| | | | |
|---|---|---|---|
| 5,729,594 A | | 3/1998 | Klingman |
| 5,745,882 A | | 4/1998 | Bixler et al. |
| 5,799,285 A | | 8/1998 | Klingman |
| 5,845,255 A | | 12/1998 | Mayaud |
| 5,893,076 A | | 4/1999 | Hafner et al. |
| 6,029,141 A | * | 2/2000 | Bezos et al. .................. 705/27 |
| 6,539,424 B1 | * | 3/2003 | Dutta .......................... 709/219 |
| 6,668,276 B1 | * | 12/2003 | Ohkado et al. ............. 709/217 |
| 6,772,208 B1 | * | 8/2004 | Dutta .......................... 709/225 |

* cited by examiner

Primary Examiner—David Y. Eng
(74) Attorney, Agent, or Firm—David W. Victor; Konrad Raynes & Victor LLP (57) ABSTRACT

Disclosed is a method, system, and program for providing a connection to a merchant server implementing a merchant electronic commerce (e-commerce) web site at a customer computer. A request is received from the customer computer, through a third party internet service provider (ISP), for a web page from the merchant server made from a link within a web page from a third party server. An installation program is transmitted to the customer computer in response to the request from the customer computer. The installation program executes on the customer computer to install an access program on the customer computer that when executed by the customer computer opens a direct connection from the customer computer to the merchant server without going through the third party ISP.

42 Claims, 5 Drawing Sheets

METHOD, SYSTEM, AND PROGRAM FOR CONNECTING TO AN ELECTRONIC COMMERCE WEB SITE

BACKGROUND OF THE INVENTION

1. Field of the Invention

The present invention relates to a method, system, and program for providing a connection from a customer computer to a merchant server implementing a merchant electronic commerce (e-commerce) web site.

2. Description of the Related Art

Many retail merchants utilize an electronic commerce ("e-commerce") web site accessible through the Internet or World Wide Web through which customers can gather information and purchase products. One concern with customers using an e-commerce web site is that the customer's Internet service provider (ISP) may be gathering information on customer "surfing" activities at the merchant e-commerce web site. The ISP could then target Internet banner ads from competitors to customers that accessed the merchant e-commerce web site or obtain information on customer spending habits that could be used to develop a computing business. For instance, certain ISPS, such as Netzero, AltaVista Company, and Yahoo! Inc., monitor the activities of Internet users accessing their site. Netzero and AltaVista offer free Internet access in exchange for the opportunity to display banner Internet ads targeted to the Internet users based on their "surfing" habits, including their activities at e-commerce web sites. Moreover, the ISP can sell anonymous information on web pages the customer visited at the merchant e-commerce web site that could be useful to competitors of the merchant.

For these reasons, there is a need in the art to provide a technique that allows merchants to offer on-line e-commerce and prevent the customers' ISP from using information on the customers' "surfing" activity at the merchant e-commerce site in a manner that adversely affects the merchants' commercial interests.

SUMMARY OF THE PREFERRED EMBODIMENTS

To overcome the limitations in the prior art described above, preferred embodiments disclose a method, system, and program for providing a connection to a merchant server implementing a merchant electronic commerce (e-commerce) web site at a customer computer. A request is received from the customer computer, through a third party internet service provider (ISP), for a web page from the merchant server made from a link within a web page from a third party server. An installation program is transmitted to the customer computer in response to the request from the customer computer. The installation program executes on the customer computer to install an access program on the customer computer that when executed by the customer computer opens a direct connection from the customer computer to the merchant server without going through the third party ISP.

In further embodiments, the access program when executed on the client computer opens a connection to a merchant ISP provided by the merchant through which the client computer accesses the merchant server.

Preferred embodiments provide a technique for setting-up an alternative connection on a customer computer when the customer computer attempts to access the merchant e-commerce web site from an external or third party server. This alternative connection allows the customer computer to connect to the merchant server directly or through a merchant operated ISP and completely bypass the third party ISP the customer normally uses. In this way, the third party ISP cannot monitor and gather information on the customer "surfing" at the merchant e-commerce web site, nor display Internet banner ads to the customer that could distract the consumer from the presentation at the merchant e-commerce web site. Preferred embodiments thus prevent third parties from tracking merchant customer Internet activities at the merchant e-commerce server and using such information against the merchant's commercial interests.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
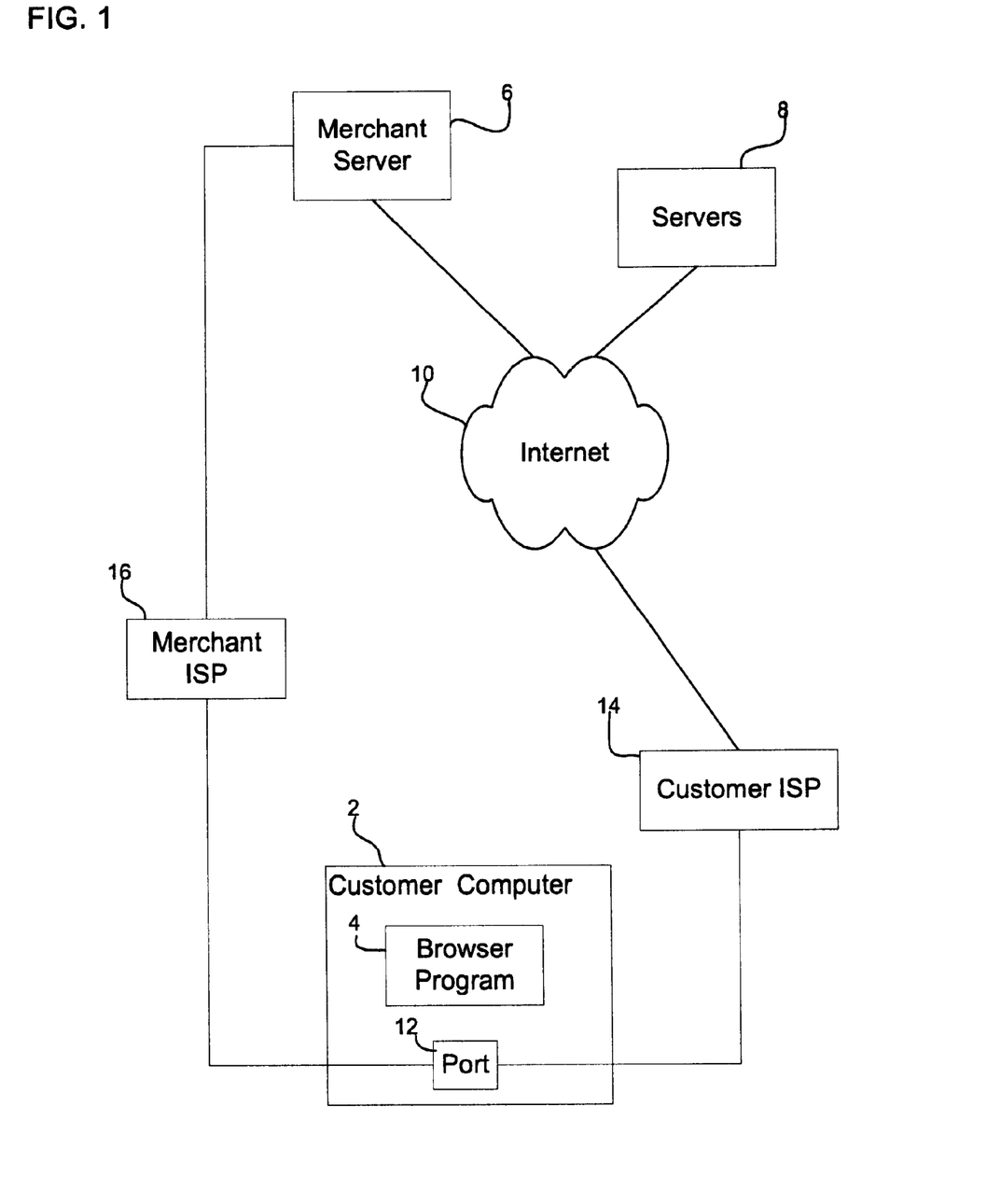
FIG. 1 illustrates a network computing environment in which preferred embodiments are implemented.

FIG. 1 illustrates a network computing environment in which preferred embodiments are implemented. The network computing environment includes at least one customer computer 2 including a browser program 4, which includes the functionality of browser programs known in the art, such as the Microsoft Explorer, Netscape Navigator, etc., to retrieve files from a merchant server 6 or other servers 8 over the Internet 10. The customer computer 2 further includes at least one communication port 12, such as a telephone modem, cable modem, digital subscriber lines (DSL), T1 line, etc., that is capable of connecting to a customer ISP 14 and a merchant ISP 16. A customer is any person interested in obtaining information or purchasing products from the merchant server 6.

The customer computer 2 may comprise any computer system known in the art capable of executing a browser program, such as a desktop, laptop, mainframe, hand held computer, palm device, telephony device, cellular phone with display and user interface, etc. The merchant server 6 and servers 8 may comprise any computer system known in the art capable of maintaining files and making such files accessible to remote computers. In preferred embodiments, the merchant server 6 implements an e-commerce web site where customers can obtain information on the merchant's products and purchase products on-line using a secure connection in a manner known in the art. The browser 4 and servers 6 and 8 communicate using a document transfer protocol such as the Hypertext Transfer Protocol (HTTP), or any other document transfer protocol known in the art, such as FTP, Gopher, WAIS, etc. In preferred embodiments, the client computer 2 can access the servers 6 and 8 over the Internet, i.e., World Wide Web, or any other network system known in the art, e.g., LAN, Ethernet, WAN, System Area Network (SAN), Token Ring, etc.

The customer computer 2 includes an input device (now shown) through which the user may enter input data to control the operation of the browser program 6, such as a keyboard, mouse, pen-stylus, touch sensitive pad, touch sensitive screen, voice decoder for decoding voice commands, etc., through which a user may enter commands to control the operation of the browser program 4.

If the customer computer 2 includes only one communication port 12, then the customer computer 2 must disconnect from the customer ISP 14 in order to connect to the merchant ISP 16. However, if the customer computer 2 maintains multiple communication ports, which it may use to independently connect to an external device, than the customer computer 2 may remain connected to both the customer 14 and merchant 16 ISPs simultaneously. In preferred embodiments, the customer computer 2 uses the customer ISP 14 to access the Internet 10 for general Internet "surfing", and uses the merchant ISP 16 to connect to the merchant server 6. The merchant server 6 or merchant ISP 16 may prevent the customer computer 2 from accessing network addresses, e.g., Universal Resource Locators (URLs), external to the merchant server 6. In other words, in preferred embodiments, the merchant ISP 16 allows a direct connection to the merchant server 6. In alternative embodiments, the merchant ISP 16 may allow the customer computer 2 to access servers 8 external and unrelated to the merchant server 6.

The customer ISP 14 may comprise a fee based ISP service or a free Internet service, such as Netzero and AltaVista, that provides free access to the Internet in exchange for the opportunity to gather customer "surfing" habits and display target banner ads based on the gathered information. In preferred embodiments, the merchant ISP 16 is available at no cost to customers to encourage customers to use the merchant ISP 16 to connect to the merchant server 6 when browsing and purchasing products from the merchant server 6 e-commerce web site. In embodiments where the ISP 16 is a phone dial-up connection, the customer may use a toll free number to connect to the merchant ISP 16 to further encourage customers to use the merchant ISP 16 for direct connection to the merchant e-commerce web site. In alternative embodiments, customers may have to become merchant members or pay a membership or user fee to access the merchant ISP 16. In still further embodiments, the customer computer 2 may access the merchant e-commerce web site via both the customer 14 and merchant 16 ISPs.

Figure 2:
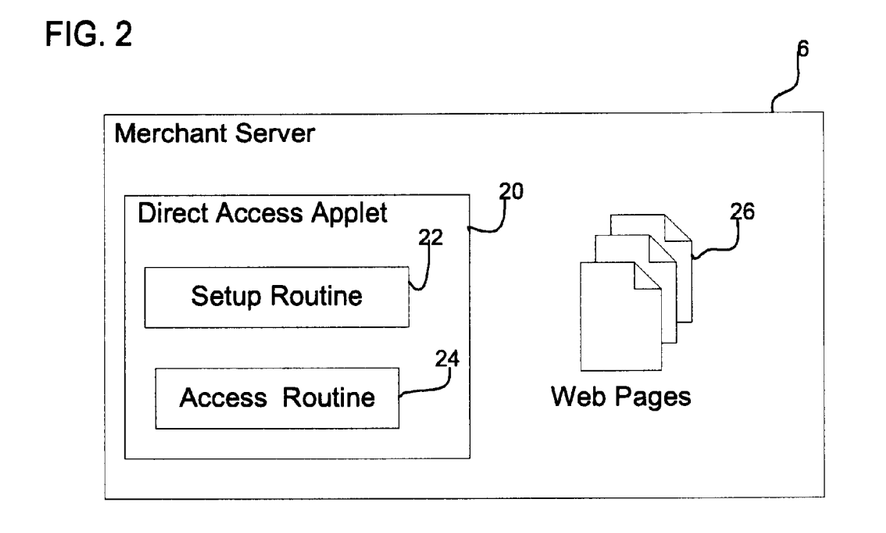
FIGS. 2 and 3 illustrate software components at the merchant server and computer in accordance with preferred embodiments of the present invention.

FIG. 2 illustrates further details of the software components installed in the merchant server 6 in which preferred embodiments are implemented. The merchant server 6 maintains a direct access applet 20, which includes a setup routine 22 and an access routine 24. In preferred embodiments, the direct access applet 20, which may be written as a Java** applet or any in other computer programming language, is capable of being executed by the browser 4 on the customer computer 2. Alternatively, the direct access applet 20 may comprise a separate, standalone computer program that executes outside of the browser 4.

**Windows is a registered trademarks of Microsoft Corporation; Netscape is a registered trademark and Netscape Communicator is a trademark of Netscape Communications Corporation; and Java is a trademark of Sun Microsystems Corporation.

The customer computer 2 may download the direct access applet 20 from the merchant server 6 over the Internet 10 while the customer computer 2 is connected to the Internet 10 through the customer ISP 14. The merchant server 6 further includes web pages 26 which browsers may download over the Internet 10 or through the merchant ISP 16. The web pages 26 implement the merchant e-commerce web site, and may be comprised of any multimedia content known in the art, such as hypertext markup language (HTML) pages, extensible markup language (XML) pages, video, image, text file, sound file, or HTML or XML pages including embedded multimedia files.

Figure 3:
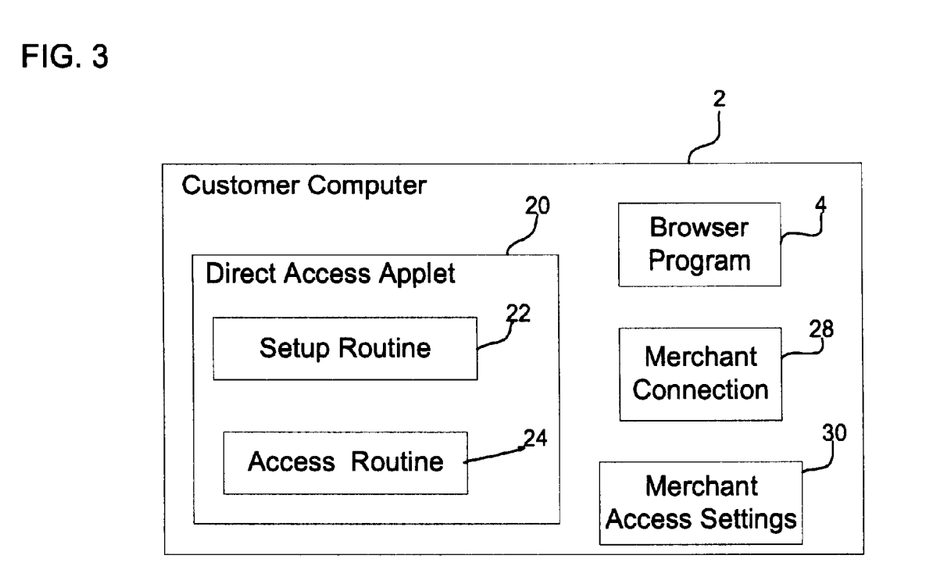

FIG. 3 illustrates software components implemented in the customer computer 2 in accordance with the preferred embodiments. The customer computer 2 downloads the direct access applet 20 using the browser 4. The setup routine 22 when executed would setup a merchant connection 28 program on the customer computer 2 that the customer computer 2 executes to access the merchant ISP 16, such as the Dial-Up network connection script program the Microsoft Corporation Windows** operating system platform creates to provide a connection to an ISP or network service. The setup routine 22 would generate merchant access settings 30 that the merchant connection 28 accesses when establishing a connection to the merchant ISP 16. The access settings 30 may be stored in the operating system registry file or in a file in non-volatile storage at the customer computer 2. The downloaded direct access applet 20 may include both the setup routine 22 and access routine 24, or only the access routine 24 if the merchant server 6 detects that the customer computer 2 already has installed the merchant connection 28, which may be detected by placing a cookie on the customer computer 2.

**Windows is a registered trademarks of Microsoft Corporation; Netscape is a registered trademark and Netscape Communicator is a trademark of Netscape Communications Corporation; and Java is a trademark of Sun Microsystems Corporation.

Figure 4:
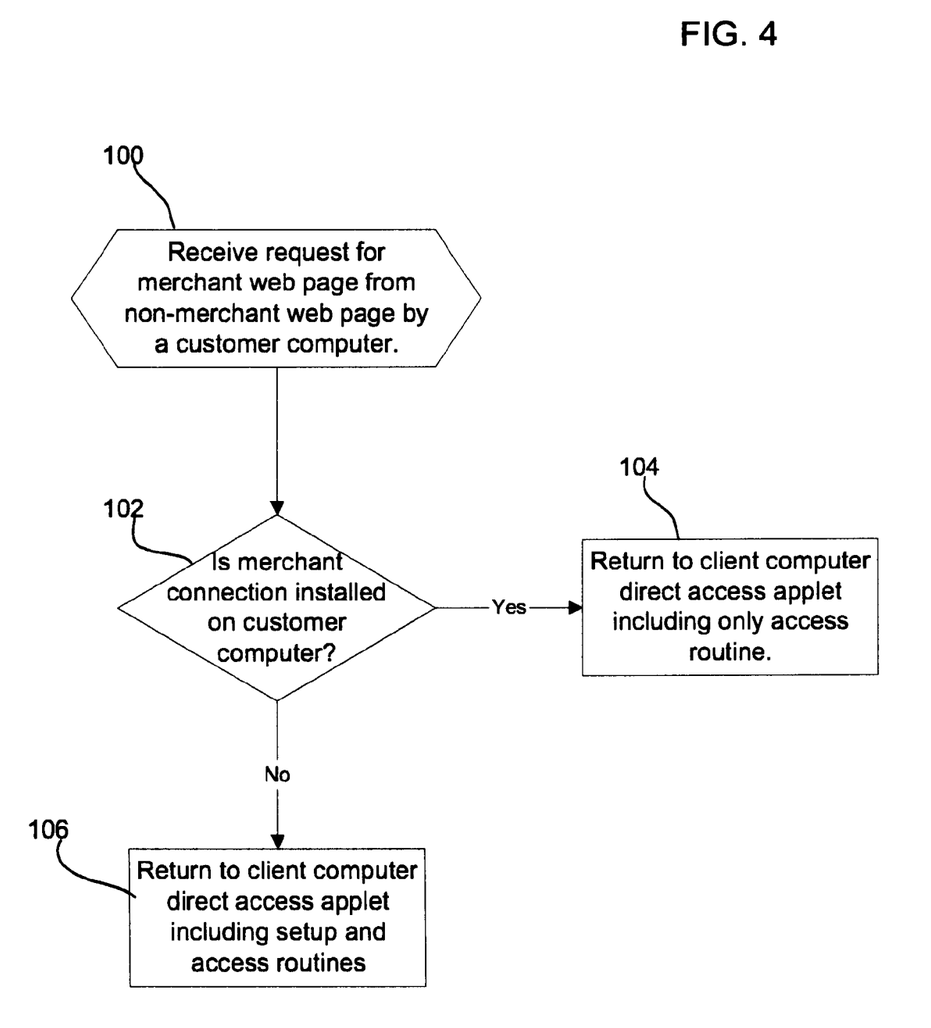
FIG. 4 illustrates logic implemented in the merchant server to provide the customer computer programs to install a direct connection to the merchant server in accordance with preferred embodiments of the present invention.

FIG. 4 illustrates logic implemented in one or more computer programs in the merchant server 6 to return the direct access applet 20 to customer computers 2. Control begins at block 100 with the merchant server 6 receiving a customer computer 2 request for the merchant web home page on the merchant e-commerce site from a link in a non-merchant web page at servers 8. For instance, the merchant may display a link to the home web page as an icon advertisement on another web site. When the customer selects the icon advertisement for the merchant they are directed, through an HTTP GET request, to the home page at the merchant server 6. The merchant server 6 may determine that the request for the merchant web home page came from a server 8 external to the merchant server 6 by examining information indicating the origin of the request or in the HTTP request. Upon receiving a request for the merchant home page, which is one of the web pages 26, from an external server 8, the merchant server 6 determines (at block 102) whether a merchant connection 28 is installed on the customer computer 2. This may be determined by checking for a cookie left on the customer computer 2 or checking elsewhere on the customer computer 2. If the merchant connection 28 is installed, then the merchant server 6 transmits to the client computer 2 (at block 104) a direct access applet 20 including only the access routine 24. Otherwise, if a merchant connection 28 is not installed, then the direct access applet 20 returned to the customer computer 2 includes the setup routine 22 and access routine 24.

Figure 5:
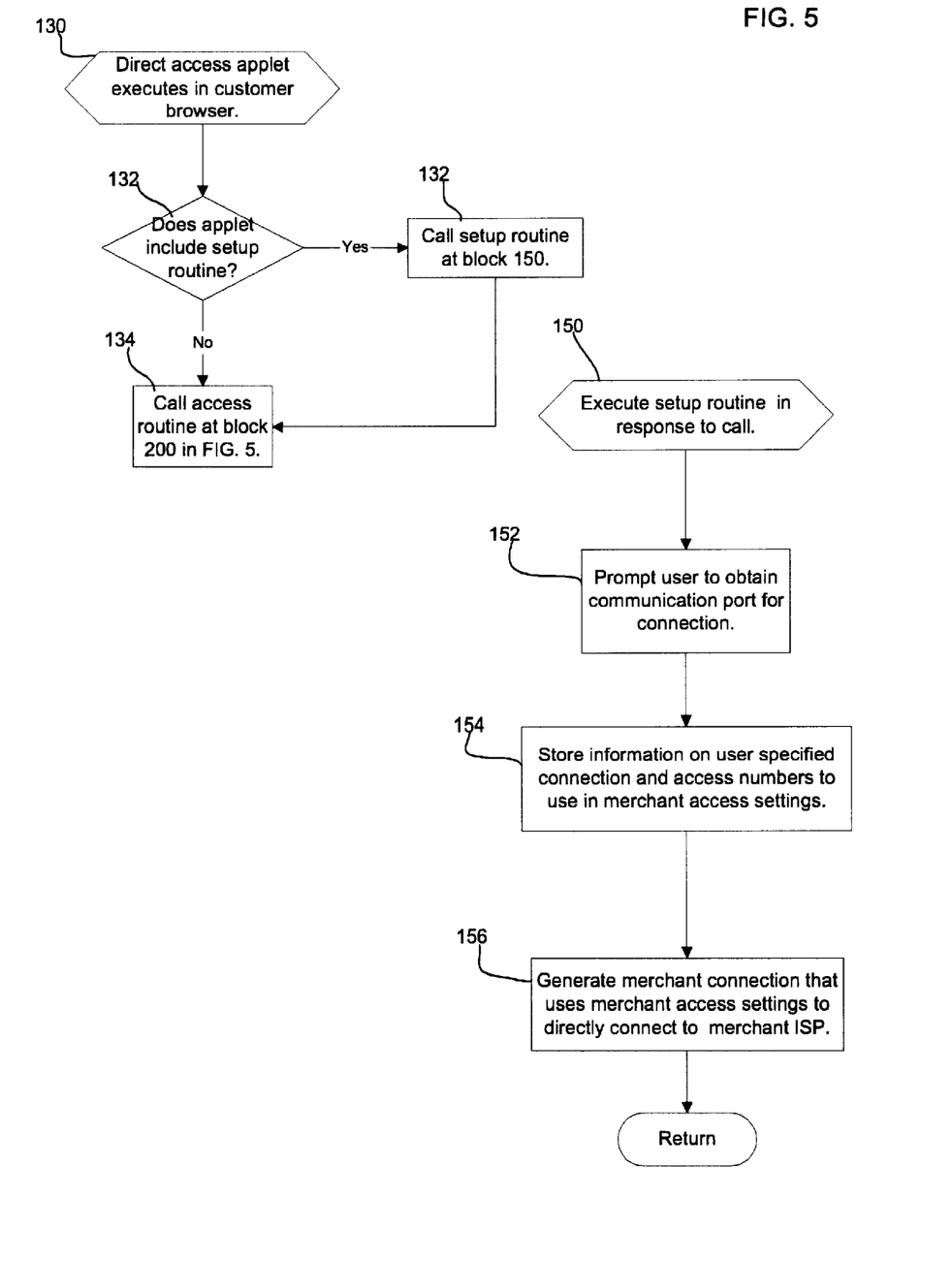
FIG. 5 illustrates logic implemented in the setup routine to install the direct connection to the merchant server in accordance with preferred embodiments of the present invention.
Figure 6:
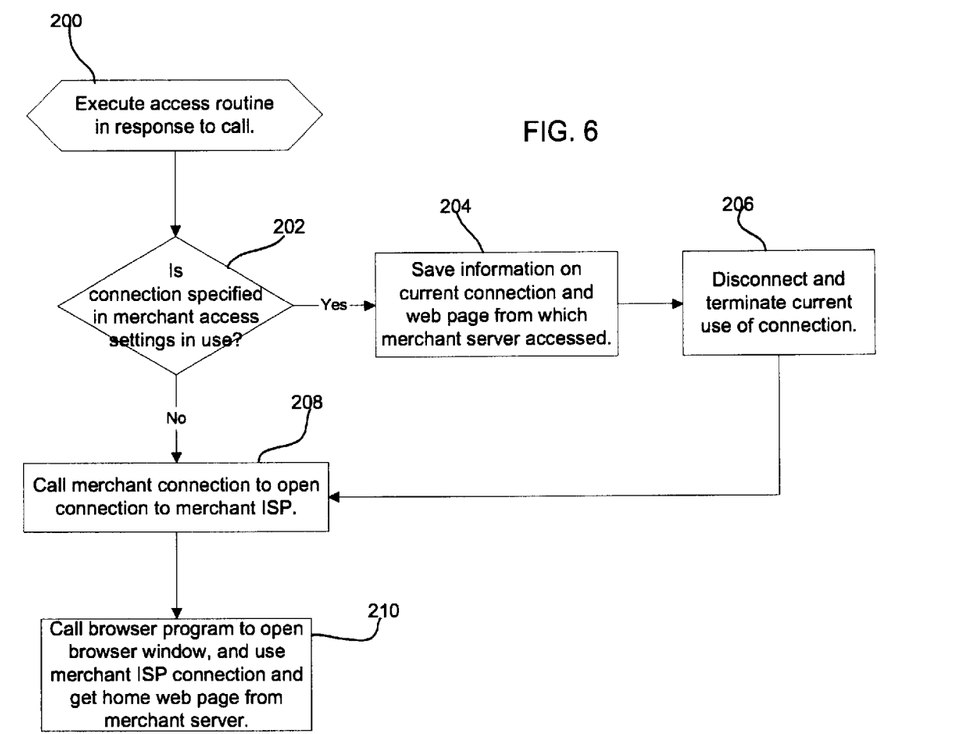
FIG. 6 illustrates logic implemented in an access routine to open the direct connection to the merchant server in accordance with preferred embodiments of the present invention.

FIGS. 5 and 6 illustrate the program logic implemented in the direct access applet 20 program components 22 and 24 when executed by the customer computer 2. As discussed, the direct access applet 20 may be executed from within the browser program 4 at the customer computer 2 or as a separate standalone program on the customer computer 2. Control begins at block 130 with the direct access applet 20 executing at the client computer 2. If the applet 20 includes the setup routine 22, then the setup routine is called (at block 132) at block 150. Otherwise, if the applet 20 only include the access routine 24 or after the setup routine 22 completes (from block 134), then control proceeds to block 200 in FIG. 6.

When the setup routine 22 is called (at block 150 in FIG. 5), then the user at the customer computer 2 is prompted (at block 152) to enter information on the communication port 12 at the client computer 2, or the setup routine 22 may automatically detect the communication port 12. The setup routine 22 then stores (at block 154) information on the user specified connection and the phone number or network address to connect to the merchant ISP 16 in the merchant access settings 30. The setup routine 22 then generates a merchant connection 28 program, such as a script program, that the customer computer 2 executes to directly connect to the merchant ISP 16 using the merchant access settings 30. Control then returns to block 132 from where the setup routine 22 was called.

FIG. 6 illustrates the program logic implemented in the access routine 24 that is executed by the customer computer 2 when the access routine 24 is called at block 134 in FIG. 5. Control begins at block 200 with a call to the access routine 22. If (at block 202) the connection specified in the merchant access settings 30 is already open and connected to another device, such as the customer ISP 14, then the access routine 24 saves information on the current connection and third part web page from which the merchant home web page was accessed and disconnects. The access routine 24 then terminates the current use of the connection specified in the merchant access settings 30. Once the connection specified in the merchant access settings 30 for use with the merchant ISP 16 is available for use (from block 206 or the no branch of block 208), then the access routine 24 calls (at block 208) the merchant connection program 28 to open a connection to the merchant ISP 16. The access routine 24 further calls (at block 210) the browser 4 to open an instance of a browser window. The merchant Web home page is retrieved from the merchant server 6 and then displayed in the opened browser window. Once the home page is retrieved, the user of the customer computer 2 may then "surf" the web pages 26 on the merchant server 6 directly through the merchant ISP 16. In this way, no third party can monitor and direct advertisements toward the customer based on their activity at the merchant web site accessed through the merchant ISP 16.

Figure 7:
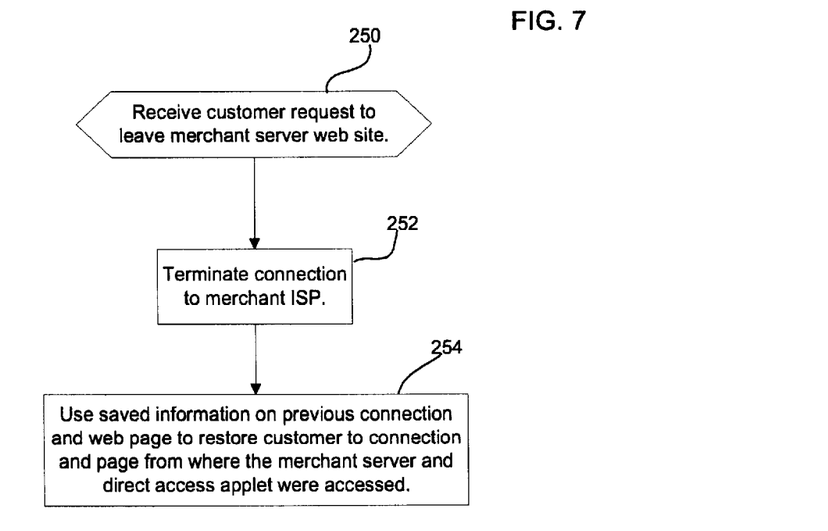
FIG. 7 illustrates logic to terminate the direct connection to the merchant server in accordance with preferred embodiments of the present invention.

FIG. 7 illustrates logic implemented in the access routine 24 when the customer wants to log-off or leave the merchant web site. Control begins at block 250 with the access routine 24 determining that the customer wants to log-off or leave the merchant web site. The access routine 24 terminates (at block 252) the merchant connection 28 to the merchant ISP 16. The access routine 24 then uses (at block 254) the saved information on the previous connection and web page from where the merchant server 6 and direct access applet 20 were accessed to restore the customer to the connection and previous web page. Those skilled in the art will appreciate that there are many ways to terminate the merchant ISP 16 access. The access routine 24 may have opened a separate browser window, leaving the browser window displaying the web page from which the merchant server 6 was accessed. In such case, once the access routine 24 closes the connection to the merchant ISP 16, the access routine 24 could reestablish the connection to the customer ISP 14 which may then be used by the browser window that is displaying the last accessed web page from which the merchant home web page was accessed.

Following are some alternative implementations of the above described embodiments.

The preferred embodiments may be implemented as a method, apparatus or program using standard programming and/or engineering techniques to produce software, firmware, hardware, or any combination thereof. The programs defining the functions of the preferred embodiment can be delivered to a computer via a variety of information bearing media, which include, but are not limited to, computer-readable devices, carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such information bearing media, when carrying computer-readable instructions that direct the functions of the present invention, represent alternative embodiments of the present invention.

In the above described embodiments, the merchant connection 28 is used by the access routine 24 when downloaded through a direct access applet 20. However, in further embodiments, the merchant connection 28 may be represented by a displayed graphical icon on the customer computer 2 desktop. The customer may then select the displayed icon to execute the merchant connection 28 routine to directly access the merchant web site through the merchant ISP 16. In this way, the customer may directly access the merchant ISP 16 and web site from the customer computer 2 desktop.

In preferred embodiments, the merchant connection 28 provides a connection to a merchant ISP 16, which in turn provides a connection to a merchant server 6. In further embodiments, the merchant connection 28 may connect the customer computer 2 directly to the merchant server 6 without going through a merchant ISP 16.

Preferred embodiments were described with respect to the HTTP protocol for transmitting documents between computers within a network. However, those skilled in the art will appreciate that the preferred embodiments may apply to any communication protocol for allowing a client to request and access files in a network environment.

In preferred embodiments, the web pages 26 being accessed are identified by a URL address and may be located on different servers connected over a common network such as the Internet. In alternative embodiments, any file addressing scheme may be used, including a file pathname indicating the location of a file in local storage. In such case, the preferred embodiments may be used to search for files located in local storage that are not dispersed throughout a network.

Preferred embodiments were described with respect to a browser program for displaying files downloaded from over a network, such as the Internet. However, in alternative embodiments, the browser program may be any viewer program, not just Internet web browsers, that are capable of accessing and displaying locally files retrieved from a server over a network.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for providing a connection to a merchant server implementing a merchant electronic commerce (e-commerce) web site at a customer computer, comprising:

receiving a request from the customer computer, through a third party internet service provider (ISP), for a web page from the merchant server made from a link within a web page from a third party server; and transmitting an installation program to the customer computer in response to the request from the customer computer, wherein the installation program is executed by the customer computer to install an access program on the customer computer that when executed by the customer computer opens a direct connection from the customer computer to the merchant server without going through the third party ISP.

2. The method of claim 1, wherein the access program when executed on the client computer opens a connection to a merchant ISP provided by the merchant through which the client computer accesses the merchant server.

3. The method of claim 1, wherein the direct connection opened by the access program uses one of a cable modem, telephone modem, a digital subscriber line (DSL), and a T-1 line.

4. The method of claim 1, wherein the installation program stores access settings on the customer computer that instruct the access program how to open the connection from the customer computer to the merchant server.

5. The method of claim 1, wherein the access program executes on the customer computer to further perform:

saving address information on the web page including the link through which the request for the web page from the merchant server was received; and after the customer computer terminates access to the merchant e-commerce web site, requesting the web page at the saved address to display in a browser program at the client computer.

6. The method of claim 1, wherein the web page from the third party server is displayed in a first browser window and wherein the access program further performs:

opening a second browser window to display the requested web page from the merchant server and further requested web pages from the merchant e-commerce web site.

7. The method of claim 1, wherein the customer computer includes a first communication port to communicate with the third party ISP and a second communication port to communicate with the merchant server, wherein the customer computer can simultaneously use the ports to separately communicate with the third party ISP and merchant server.

8. The method of claim 7, wherein the first and second communication ports comprise one of a cable modem, telephone modem, a digital subscriber line (DSL), and a T-1 line.

9. The method of claim 7, wherein the web page from the third party server is displayed in a first browser window and wherein the access program further performs:

opening a second browser window at the client computer to display the requested web page and further requested web pages from the merchant server, wherein the customer computer is capable of concurrently accessing web pages from the third party ISP and merchant server through the first and second communication ports, respectively, to display in the first and second browser windows, respectively.

10. The method of claim 1, wherein the customer computer includes one communication port to communicate with one of the third party ISP and the merchant server at a time.

11. The method of claim 10, wherein the access program executes on the customer computer to further perform:

disconnecting from the third party ISP on the communication port, wherein the connection to the merchant server is opened on the communication port after disconnecting from the third party ISP.

12. The method of claim 11, wherein the access program executes on the customer computer to further perform:

saving address information on the web page including the link through which the request for the web page from the merchant server was made before disconnecting from the third party ISP;

after the customer computer terminates access to the merchant e-commerce web site, disconnecting from the merchant server on the communication port;

opening a connection to the third party ISP on the communication port; and requesting the web page at the saved address on the opened communication port through the third party ISP.

13. The method of claim 1, wherein the installation program further installs an access icon to be displayed on a user interface desktop of the client computer, wherein user selection of the access icon executes the access program.

14. The method of claim 1, wherein the access program is executed in response to the customer computer subsequently requesting the web page from a link in a web page from one third party server.

15. A system for providing a connection to a merchant server implementing a merchant electronic commerce (e-commerce) web site at a customer computer, comprising:

means for receiving a request from the customer computer, through a third party internet service provider (ISP), for a web page from the merchant server made from a link within a web page from a third party server; and means for transmitting an installation program to the customer computer in response to the request from the customer computer, wherein the installation program includes code that when executed on the customer computer performs installing an access program on the customer computer, wherein the access program includes code that when executed by the customer computer opens a direct connection from the customer computer to the merchant server without going through the third party ISP.

16. The system of claim 15, wherein the access program further includes code that when executed on the client computer further performs opening a connection to a merchant ISP provided by the merchant through which the client computer accesses the merchant server.

17. The system of claim 15, wherein the system further includes at least one communication port comprising a cable modem, telephone modem, a digital subscriber line (DSL), or a T-1 line, wherein the direct connection opened by the access program uses the communication port.

18. The system of claim 15, wherein the installation program stores access settings on the customer computer that instruct the access program how to open the connection from the customer computer to the merchant server.

19. The system of claim 15, wherein the access program further includes code that when executed on the client computer further performs:
   saving address information on the web page including the link through which the request for the web page from the merchant server was received; and
   after the customer computer terminates access to the merchant e-commerce web site, requesting the web page at the saved address to display in a browser program at the client computer.

20. The system of claim 15, wherein the web page from the third party server is displayed in a first browser window and wherein the access program further includes code that when executed on the client computer further performs:
   opening a second browser window to display the requested web page from the merchant server and further requested web pages from the merchant e-commerce web site.

21. The system of claim 15, wherein the customer computer includes a first communication port to communicate with the third party ISP and a second communication port to communicate with the merchant server, wherein the customer computer can simultaneously use the ports to separately communicate with the third party ISP and merchant server.

22. The system of claim 21, wherein the first and second communication ports comprise one of a cable modem, telephone modem, a digital subscriber line (DSL), and a T-1 line.

23. The system of claim 21, wherein the web page from the third party server is displayed in a first browser window at the customer computer and wherein the access program further includes code that when executed on the client computer further performs:
   opening a second browser window at the client computer to display the requested web page and further requested web pages from the merchant server, wherein the customer computer is capable of concurrently accessing web pages from the third party ISP and merchant server through the first and second communication ports, respectively, to display in the first and second browser windows, respectively.

24. The system of claim 15, wherein the customer computer includes one communication port to communicate with one of the third party ISP and the merchant server at a time.

25. The system of claim 24, wherein the access program further includes code that when executed on the client computer further performs:
   disconnecting from the third party ISP on the communication port, wherein the connection to the merchant server is opened on the communication port after disconnecting from the third party ISP.

26. The system of claim 25, wherein the access program further includes code that when executed on the client computer further performs:

saving address information on the web page including the link through which the request for the web page from the merchant server was made before disconnecting from the third party ISP;
   after the customer computer terminates access to the merchant e-commerce web site, disconnecting from the merchant server on the communication port;
   opening a connection to the third party ISP on the communication port; and
   requesting the web page at the saved address on the opened communication port through the third party ISP.

27. The system of claim 15, wherein the installation program further includes code that when executed on the client computer further performs installing an access icon to be displayed on a user interface desktop of the client computer, wherein user selection of the access icon executes the access program.

28. The system of claim 15, wherein the access program is executed in response to the customer computer subsequently requesting the web page from a link in a web page from one third party server.

29. A program for providing a connection to a merchant server implementing a merchant electronic commerce (e-commerce) web site at a customer computer, wherein the merchant server transmits a program to the customer computer through a third party Internet service provider (ISP) through which the client computer requested the program, and wherein the program includes an installation program and access program that include code capable of causing the customer computer to perform:
   installing, with the installation program, an access program on the customer computer; and
   opening, with the access program, a direct connection from the customer computer to the merchant server without going through the third party ISP.

30. The program of claim 29, wherein the access program further includes code capable of causing the client computer to perform opening a connection to a merchant ISP provided by the merchant through which the client computer accesses the merchant server.

31. The program of claim 29, wherein the direct connection opened by the access program uses one of a cable modem, telephone modem, a digital subscriber line (DSL), and a T-1 line.

32. The program of claim 29, wherein the installation program further includes code capable of causing the customer computer to perform storing access setting on the customer computer that instruct the access program how to open the connection from the customer computer to the merchant server.

33. The program of claim 29, wherein the access program further includes code capable of causing the customer computer to perform:
   saving address information on the web page including the link through which the request for the web page from the merchant server was received; and
   after the customer computer terminates access to the merchant e-commerce web site, requesting the web page at the saved address to display in a browser program at the client computer.

34. The program of claim 29, wherein the web page from the third party server is displayed in a first browser window and wherein the access program further includes code capable of causing the customer computer to perform:
   opening a second browser window to display the requested web page from the merchant server and further requested web pages from the merchant e-commerce web site.

35. The program of claim 29, wherein the customer computer includes a first communication port to communicate with the third party ISP and a second communication port to communicate with the merchant server, wherein the customer computer can simultaneously use the ports to separately communicate with the third party ISP and merchant server.

36. The program of claim 35, wherein the first and second communication ports comprise one of a cable modem, telephone modem, a digital subscriber line (DSL), and a T-1 line.

37. The program of claim 35, wherein the web page from the third party server is displayed in a first browser window of the customer computer, and wherein the access program further includes code capable of causing the customer computer to perform:
   opening a second browser window at the client computer to display the requested web page and further requested web pages from the merchant server, wherein the customer computer is capable of concurrently accessing web pages from the third party ISP and merchant server through the first and second communication ports, respectively, to display in the first and second browser windows, respectively.

38. The program of claim 29, wherein the customer computer includes one communication port to communicate with one of the third party ISP and the merchant server at a time.

39. The program of claim 38, wherein the access program further includes code capable of causing the customer computer to perform:
   disconnecting from the third party ISP on the communication port, wherein the connection to the merchant server is opened on the communication port after disconnecting from the third party ISP.

40. The program of claim 39, wherein the access program further includes code capable of causing the customer computer to perform:
   saving address information on the web page including the link through which the request for the web page from the merchant server was made before disconnecting from the third party ISP;
   after the customer computer terminates access to the merchant e-commerce web site, disconnecting from the merchant server on the communication port;
   opening a connection to the third party ISP on the communication port; and
   requesting the web page at the saved address on the opened communication port through the third party ISP.

41. The program of claim 29, wherein the installation program further includes code capable of causing the customer computer to perform installing an access icon to be displayed on a user interface desktop of the client computer, wherein user selection of the access icon executes the access program.

42. The program of claim 29, wherein the access program is executed in response to the customer computer subsequently requesting the web page from a link in a web page from one third party server.

* * * * *